3,088,828
METHODS FOR TREATING CORN FLOUR
Herbert O. Renner, 332 N. Wolf Road, Des Plaines, Ill.
No Drawing. Filed June 23, 1959, Ser. No. 15,781
(Filed under Rule 47(b) and 35 U.S.C. 118)
4 Claims. (Cl. 99—91)

The present invention relates to the treatment of yellow corn flour and particularly to a novel method for bleaching yellow corn flour. The invention also has utility in modifying the physical properties of corn flour in general, being particularly useful in increasing the water imbibing properties thereof.

In view of the steadily decreasing supply of white corn, there has for some time been a critical need in industry for an effective method of bleaching yellow corn flour to provide a substitute for white corn flour. However, the pigment content of yellow corn is different from that of wheat flour, and none of the conventional bleaching methods have proved successful for treating yellow corn. Some pigments of yellow corn flour are particularly stable towards oxidation and are unusually difficult to attack chemically.

As described and claimed in my copending application Serial Number 15,783, filed concurrently herewith, I have discovered that certain oxidatively active reaction product mixtures obtained from acetone and hydrogen peroxide are particularly effective in the oxidative treatment of cereal flours. The present invention is based upon the discovery that such oxidatively active agents are capable of bleaching yellow corn flour and desirably modifying the physical properties of corn flours in general.

Neither acetone nor hydrogen peroxide, taken singly, is capable of accomplishing the results of the present invention. Similarly, a fresh mixture of acetone and hydrogen peroxide, prepared at ordinary temperatures, will neither satisfactorily bleach yellow corn flour nor increase the water imbibing properties of corn flour, when the mixture is contacted with the flour at normal temperatures. However, if a mixture of acetone and hydrogen peroxide is contacted with yellow corn flour at an elevated temperature, the yellow color of the flour is removed, and the water imbibing properties of the flour increased, to an extent dependent upon the temperature and the quantity of acetone and hydrogen peroxide employed. Further, these results can be improved, in accordance with certain embodiments of the invention, if the heat treatment is carried out while the corn flour is in contact with a moist atmosphere, as when the flour is directly contacted with a controlled amount of steam. As will be described hereinafter, these advantageous results occur because of the formation, by reaction between the acetone and hydrogen peroxide, of material amounts of bis-(1,1'-hydroperoxy 1,1'-methyl)diethyl peroxide and other acyclic peroxidic compounds of acetone. Certain embodiments of the invention involve reaction of the acetone and hydrogen peroxide, before these materials are combined with the corn flour, so that the oxidatively active reaction product mixture is formed as a preliminary step of the method.

It has long been recognized that acetone and hydrogen peroxide can be reacted in the presence of certain strong catalysts to produce cyclic dimeric and trimeric acetone peroxides. Such cyclic peroxides, however, while useful for various purposes in industry, have no material ability to bleach or otherwise improve cereal flours. I have found that, if acetone and hydrogen peroxide are combined and the resulting mixture subjected to certain controlled aging reaction conditions, the formation of the cyclic polymeric acetone peroxides can be minimized and a reaction product mixture obtained which possesses the ability to bleach and otherwise desirably improve yellow corn flour. Assuming that the acetone and hydrogen peroxide are aged or reacted prior to contact with the flour, the formation of the desired reaction product mixture is accomplished at temperatures not exceeding the boiling point, under refluxing, of the liquid acetone-hydrogen peroxide system, this temperature normally being below 100° C., and the aging or reaction period varies inversely as the temperature employed. The reaction is accelerated by presence of acid catalysts, by use of high strength hydrogen peroxide solutions in forming the initial reaction mixture and by increasing the relative concentration of hydrogen peroxide in the initial reaction mixture. Employing 35% aqueous hydrogen peroxide, with no catalyst and using a minimum temperature of about 4° C., the reaction proceeds very slowly and the time period can be as long as many weeks. Using a maximum of about 2% by weight of an acid catalyst and an elevated temperature not above the boiling point of the reaction mixture, usually below 100° C., the reaction period is shortened to as little as a few seconds, depending upon the temperature and the effectiveness of the catalyst. Using molar proportions of acetone and 35% aqueous hydrogen peroxide, the ranges of variables are as follows:

| Temperature (° C.) | Catalyst (Percent by Weight) | Time |
|---|---|---|
| 4 | None | 2-50 weeks. |
| 4 | 0.1 (phosphoric acid) | 24 hours-2 weeks. |
| Room | None | 1-2 weeks. |
| Do | 1.0 (weak acid) | ½-12 hours. |
| Do | 1.0 (phosphoric acid) | 30-90 minutes. |
| Do | 1.0 (hydrochloric acid) | 10-30 minutes. |
| Boiling point | None | 30 min.-several hours. |
| Do | 0.1 (phosphoric acid) | several minutes. |
| Do | 2.0 (phosphoric acid) | several seconds. |

Compositions prepared in the manner just described can be characterized as (1) exhibiting oxidative activity in the sense that the composition is able to at least mature wheat flour when employed in proportions providing a hydrogen peroxide equivalent on the order of 0.001% of the weight of the flour, (2) having a substantial titratable peroxide content afforded by acetone peroxides other than cyclic acetone peroxide polymers, (3) containing a material proportion of bis-(1,1'-hydroperoxy 1,1'-methyl diethyl peroxide, having the formula

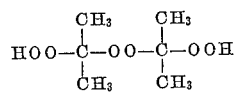

and (4) being substantially free from crystallized cyclic acetone peroxide polymers. Such composition also may contain material amounts of unreacted acetone and hydrogen peroxide, which unreacted compounds can be partially or substantially completely removed. Considering the reaction product mixture as described thus far, it will be understood that the organic peroxide content thereof is entirely in solution in the liquid system.

Bis-(1,1'-hydroperoxy 1,1'-methyl) diethyl peroxide is, by itself, an effective and valuable peroxidic agent for treating flours and its incorporation in corn flour constitutes an important aspect of the present invention. However, the reaction product mixtures involved in the present invention contain other acetone peroxides which contribute to the effectiveness of my method, one such compound being the corresponding dihydroperoxy trimer:

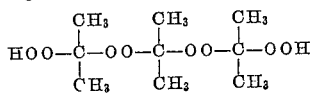

By analytical procedures described in my aforementioned copending application Serial No. 15,783, it can be shown that the reaction product mixtures produced under the conditions hereinbefore defined always contain a material proportion, varying from a few percent to a maximum of about 25% by weight of the total titratable peroxide content of the reaction mixture, of bis-(1,1'-hydroperoxy 1,1'-methyl) diethyl peroxide, the amount of such compound present depending upon the reaction or aging time, temperature and catalyst properties and strength. Of the remaining titratable peroxide content of the reaction mixture, a substantial proportion, usually not more than 10%, is provided by free hydrogen peroxide. The major proportion of such remainder, however, is provided by acetone peroxides, primarily hydroperoxidic, as yet unidentified, such products amounting to as much as 65% by weight of the total titratable peroxide content of the reaction mixture.

In accordance with the present invention, the corn flour to be treated is heated to a temperature below that at which carmelization occurs in the particular corn flour. Thus, for most corn flours, the heating step involves temperatures not exceeding about 125° C. As has been mentioned, certain embodiments of the invention involve the addition to the corn flour, prior to the heating step, of a mixture of acetone and hydrogen peroxide which has not been subjected to the aging or reaction conditions hereinbefore defined. While relatively low temperatures can be employed, the heating period then being extended, the heating step should provide a temperature of at least about 70° C. It is to be understood that, in such cases, the step of heating the corn flour, with the acetone and hydrogen peroxide incorporated therein, is effective to cause the desired peroxidic reaction product mixture to be produced in situ in the flour.

Whether employing a pre-formed reaction product mixture or a substantially unreacted mixture of acetone and hydrogen peroxide, a sufficient quantity of the treating material should be employed, to provide a hydrogen peroxide equivalent content amounting to at least about 0.01% of the corn flour being treated and this proportion can be increased to several percent of the weight of the corn flour. The relative proportion of acetone and hydrogen peroxide employed can be such as to provide a ratio of acetone to hydrogen peroxide, by weight, in the range of from about 100:1 to about 1:20.

Catalysts suitable for use in promoting reaction of the acetone and hydrogen peroxide to provide the peroxidic reaction product mixture are the acid catalysts having a dissociation constant of at least about $6 \times 10^{-10}$. Of such catalysts, I have found that the strong mineral acids are markedly superior, phosphoric acid and hydrochloric acid being particularly advantageous. Other suitable acids include iodic acid, bromic acid, phosphoric acid, acetic acid, boric acid, lactic acid and pyruvic acid. Acid salts, such as sodium acidpyrophosphate, for example, are suitable.

The more strongly ionized acids, such as the mineral acids, have a greater catalytic effect in bringing about the desired state of oxidative activity in my compositions than do the weakly ionized acids, such as boric acid. It is accordingly possible to pre-select the aging time and temperature by choice of the acid catalyst and its concentration. Thus, in a process for continuously producing oxidatively active compositions in accordance with the invention, where aging is desirably effected quickly, I may use a relatively large proportion of a relatively strongly ionized acid. On the other hand, if the particular commercial situation involved allows slow aging, I may employ a more weakly ionized acid or, in some instances, no catalyst at all.

The catalysts may be employed in proportions in the range of 0–2% by weight of the reaction mixture.

Solid, particulate, edible carriers which are suitable for the invention include food starches, heat-modified food starches, dextrines, wheat flour, defatted wheat flour, heat-treated wheat flour, pre-oxidized starches and flours, wheat gluten, vegetable proteins, such as soybean protein, and edible inorganic materials such as inorganic phosphates and calcium sulfate, which are inert to peroxides. The particular carrier employed should provide a porous structure or a large effective surface area so that the oxidatively active materials can be retained by absorption and/or adsorption.

Carrier-supported compositions can be prepared by first aging the liquid system of acetone and hydrogen peroxide and then uniformly distributing the aged liquid system on the particulate carrier. Alternatively, part or all of the aging can be carried out after the acetone-hydrogen peroxide system has been distributed on the carrier. While most aging procedures within the limits hereinbefore mentioned can be carried out after depositing the liquid system on the carrier, I have found it particularly advantageous to first preliminarily age the liquid system, as by a heat treatment, or by use of both heat and a small proportion of acid catalyst, or by catalytic aging without heating, then add a final quantity of acid catalyst to the preliminarily aged liquid system, and then deposit the preliminarily aged system on the carrier.

Rather than using solid carriers, I may employ liquids as the carrier materials. In particular, I find it advantageous to employ relatively non-volatile organic liquids which are substantially inert to active oxygen. Thus, paraffin oil is an excellent liquid carrier material. In this connection, it is to be understood that the paraffin oil or the like serves only as a carrier for the active acetone-hydrogen peroxide system, with such system being capable of emitting or forming oxidatively active vapors. When such a composition is employed to treat food material, the carrier liquid is not introduced into the food material.

As will be understood by those skilled in the art, it is difficult to prepare acetone-hydrogen peroxide reaction systems in accordance with the invention which do not contain at least a certain amount of water, it being most practical to work with aqueous hydrogen peroxide solutions containing 30–50% peroxide. In some instances, it is advantageous to reduce the water content of the active system and so concentrate the system as to acetone and peroxide. For this reason, I have found it useful to employ a carrier, such as calcium sulfate-semihydrate, for example, which, because of its chemical water-binding capabilities, is able to take up some of the water from the liquid system. Similarly, carriers such as dry gluten, which are capable of physically binding water, are also advantageous.

As has been mentioned, certain advantageous embodiments of my process involve treatment of the corn flour and simultaneous presence of a moist atmosphere. The moist atmosphere can be established by carrying out the eating step in a closed vessel and introducing water into the vessel at the same time that the corn flour is introduced or subsequent thereto, so that the heat treament vaporizes all or a portion of the water, the liquid being maintained out of direct contact with the flour. Alternatively, the method can be carried out in a closed vessel and steam injected into the vessel to provide both heat and a moist atmosphere. The bleaching and modifying operation can be carried out either at atmospheric pressure, or at elevated pressures, the latter condition being effective to provide a final product without residual reactive oxygen.

The following examples are illustrative of the invention:

*Example 1*

To 4 g. of heat-modified yellow corn flour was added 0.2 cc. of aqueous hydrogen peroxide (50% $H_2O_2$). The material was agitated to obtain uniformity and then blended with 40 g. yellow corn flour. The blend was exposed to vapors of 0.4 cc. acetone, in a closed system, then blended with 40 g. additional yellow corn flour and the total blend exposed to vapors of 1 cc. acetone in a closed system for several days. The resulting mixture was then heated in a loosely covered dish for 16 hours at 110° C. At the end of this period, the flour reacted negatively to potassium iodide and showed a very pronounced bleach, the yellow color having been largely removed.

Samples of the treated flour and untreated yellow corn flour were exposed to steam. The untreated sample swelled and liquified. The treated sample did not swell, gel or liquify, indicating increased water-imbibing properties.

This example illustrates operability of the present invention to obtain bleaching and desirable modification of the physical properties of yellow corn flour by a peroxidic reaction product mixture formed directly on the corn flour being treated.

*Example 2*

Three grams of heat modified yellow corn flour was immersed in a small quantity of acetone in an open container. No bleaching effect was observed. One-tenth cc. of aqueous hydrogen peroxide (50% $H_2O_2$) was then added and the material allowed to stand at room temperature until no apparent liquid phase remained. The corn flour was still decidedly yellow. The material was then placed on top of a drying oven, at about 70–75° C., and allowed to stand until completely dry in appearance. The corn flour was now definitely bleached and showed a strongly positive potassium iodide reaction. Moistening with additional acetone and heating for 32 hours at 105° C. did not reduce the strongly positive potassium iodide reaction. The flour was then heated for an additional 23 hours at 115° C., and was then nearly completely bleached and showed only a very mild potassium iodide reaction.

This example again illustrates a bleaching and modifying treatment effected by formation of the reaction product mixture directly on the corn flour and further shows that the final heating step, in the absence of added moisture, does not remove the residual oxidative activity from the treated flour.

*Example 3*

Into 200 g. of ungelatinized yellow corn flour was introduced a freshly prepared blend of 0.2 cc. hydrogen peroxide solution (50% $H_2O_2$) and 0.8 cc. acetone. After aging for 21 hours in a closed system, the material was heated for 25½ hours in an open container at 80° C., then stored for 4 days. The treated material showed a pronounced bleach and practically negative potassium iodide reaction.

*Example 4*

A liquid system consisting of 20 cc. of aqueous hydrogen peroxide (30% $H_2O_2$) and 20 cc. acetone was aged at room temperature for 22½ hours in a loosely covered flask. Ten grams of heat processed yellow corn flour was then uniformly combined with 0.35 cc. of the aged solution and allowed to stand for 31 hours in a closed container. No color improvement resulted. The treated flour was then heated at 98° C. in an open container for 22 hours. At the end of this period, a very pronounced bleach had occurred. This procedure was repeated, except that the liquid acetone-hydrogen peroxide system was not aged before addition to the corn flour, the composition then being stored at room temperature for 45 hours, allowed to absorb moisture from water vapor, and then heated for 2 hours at 98° C. A very pronounced bleach was again obtained at the end of the heating step without exhausting the oidative activity present, the treated flour still reacting positively with potassium iodide.

This example illustrates the use of a reaction product mixture prepared by room temperature aging before application of the treating material to the corn flour.

*Example 5*

One cc. of the room-temperature-aged acetone-hydrogen peroxide system of Example 4 was uniformly combined with 20 g. heat-modified yellow corn flour and the treated flour stored for 26 hours, at room temperature and then heated for 4 hours at 98° C. The corn flour then showed a pronounced bleach and gave a very pronounced positive potassium iodide reaction, remaining unchanged after an additional 18 days' storage in the open at room temperature. The material was then stored in a closed container along with sufficient water to maintain a moist atmosphere in the container, the water and flour being out of direct contact. At the end of 19 hours, the flour had become damp, by absorption of water vapor, but showed no additional bleach. The damp material was heated for 3 hours at 102–103° C. in a closed but unsealed container also containing a quantity of water, so that a moist atmosphere was present but superatmospheric pressures were not developed. At the end of this period, the corn flour showed a very excellent bleach. The final product still showed a very strongly positive potassium iodide reaction.

*Example 6*

Equal proportions of aqueous hydrogen peroxide (30% $H_2O_2$) and acetone were mixed and the resulting freshly prepared liquid system blended with powdered, food grade corn starch at the rate of 25 g. starch to 20 cc. of the liquid. The resulting composition was dried at room temperature in an open beaker for nine days. After drying, 0.135 g. of this oxidatively active composition was blended uniformly with 50 g. of heat-modified corn flour. The treated corn flour and 5 cc. water were placed in separate dishes in a sealed desiccator and heated at 101° C. for 4¼ hours. At the end of this period, the yellow color of the corn flour had been substantially completely removed and the product was negative to potassium iodide.

This example illustrates the use of a reaction product mixture prepared on starch before incorporation with the corn flour, and also demonstrates that use of moderate steam pressure, during heating of the corn flour, releases all of the oxidative activity of the reaction products.

*Example 7*

The procedure of Example 6 was repeated, except that that desiccator was closed, but not sealed, and heating was at 100° C. for 70 minutes. In this case, the desiccator was closed by a piece of heavy plate glass weighted by a 1 kg. weight, but no sealing material was employed, so that the steam produced during heating escaped periodically. Thus, while Example 6 resulted in the treated corn flour being under moderate steam pressure for a prolonged period, a much lower pressure was maintained in the present example. At the end of the 70-minute heating period, the treated corn flour showed a pronounced bleach, only a creamy color remaining. The final product was only mildly positive to potassium iodide.

*Example 8*

Four glass shelves were disposed in a desiccator. On the lower three shelves, layers of heat-modified yellow corn flour were deposited, at about 5 g. per layer. On the top shelf was placed an open dish containing 0.5 cc. of aqueous hydrogen peroxide. After 20 hours' standing, with the desiccator closed and no color change appearing in the corn flour, acetone vapors were introduced into the desiccator in an amount approximately equal to the peroxide solution. The desiccator was then allowed to stand closed at room temperature for 4 days. Some bleaching was then apparent, with the corn flour on the upper shelf showing the greatest color removal, even the bleach of the uppermost material being entirely inadequate. Most of the liquid had evaporated from the dish on the top shelf. The three quantities of treated corn flour were mixed together and heated in a loosely covered dish at 110° C. for 115 hours. The final product was very well bleached and gave a pronounced positive reaction with potassium iodide.

I claim:
1. A method for treating corn flour to at least improve the water imbibing capacity thereof, comprising combining acetone and hydrogen peroxide with the corn flour, the acetone and hydrogen peroxide being employed in a weight ratio of from 100:1 to 1:20 and amounts sufficient to provide in the flour a hydrogen peroxide equivalent content of from 0.01% to several percent of the flour weight, and heating the flour at a product temperature which is at least 70° C. but below that at which carmelization occurs in the flour being treated, and thereby causing the acetone and hydrogen peroxide to react to form a reaction product mixture which contains a material proportion of bis-(1,1'-hydroperoxy 1,1'-methyl) diethyl peroxide and is capable of increasing the water imbibing capacity of the flour and bleaching the flour.

2. A method for bleaching yellow corn flour comprising heating the flour, at a product temperature which is at least 70° C. but below the temperature at which carmelization occurs in the flour being treated, in the presence of a liquid peroxidic reaction product mixture, which is at least substantially free from crystallized cyclic acetone peroxide polymers and has a substantial titratable peroxide content other than free hydrogen peroxide, a material proportion of the titratable peroxide content of said reaction product mixture being bis-(1,1'-hydroperoxy 1,1'-methyl) diethyl peroxide, said reaction product mixture being employed in an amount providing a hydrogen peroxide equivalent value equal to from 0.01% to several percent of the weight of the flour being treated, said reaction product mixture being derived from acetone and hydrogen peroxide in a weight ratio of from 100:1 to 1:20.

3. The method of claim 2 wherein the flour is heated by subjecting the same to direct contact with steam.

4. The method of claim 2 wherein the flour is heated in the presence of a moist atmosphere.

References Cited in the file of this patent
UNITED STATES PATENTS

| | | |
|---|---|---|
| 1,483,546 | Gelissen | Feb. 12, 1924 |
| 1,866,412 | Vander Lee | July 5, 1932 |
| 2,343,048 | Eble et al. | Feb. 29, 1944 |
| 2,903,361 | Marks et al. | Sept. 8, 1959 |

OTHER REFERENCES

"Organic Peroxides—Their Chemistry Decomposition and Role in Polymerization," 1954, by Tobolsky et al., Interscience Publishers, Inc. (New York), p. 45. (Copy in Div. 38.)